: US 11,134,071 B2
(45) Date of Patent: Sep. 28, 2021

(12) United States Patent
Kumar et al.

(54) DATA EXCHANGE DURING MULTI FACTOR AUTHENTICATION

(71) Applicant: Oracle International Corporation, Redwood Shores, CA (US)

(72) Inventors: Pruthvithej Ramesh Kumar, Bangalore (IN); Nagaraj Pattar, Gulbarga (IN); Mohamad Raja Gani Mohamad Abdul, Fremont, CA (US); Parthipan Kandasamy, Tamil Nadu (IN); Samanvitha Kumar, Bangalore (IN); S Ashok Kumar, Tamil Nadu (IN)

(73) Assignee: Oracle International Corporation, Redwood Shores, CA (US)

( * ) Notice: Subject to any disclaimer, the term of this patent is extended or adjusted under 35 U.S.C. 154(b) by 196 days.

(21) Appl. No.: 15/959,806

(22) Filed: Apr. 23, 2018

(65) Prior Publication Data
US 2019/0327223 A1    Oct. 24, 2019

(51) Int. Cl.
*H04L 29/06* (2006.01)
*H04L 9/00* (2006.01)
(Continued)

(52) U.S. Cl.
CPC .......... *H04L 63/0807* (2013.01); *H04L 9/006* (2013.01); *H04L 9/3213* (2013.01); *H04L 63/0853* (2013.01); *H04L 9/0894* (2013.01); *H04L 63/0823* (2013.01); *H04L 2463/082* (2013.01); *H04W 12/06* (2013.01)

(58) Field of Classification Search
CPC ... H04L 63/0807; H04L 9/006; H04L 9/3213; H04L 63/0853; H04L 2463/082
See application file for complete search history.

(56) References Cited

U.S. PATENT DOCUMENTS 8,627,438 B1    1/2014  Bhimanaik
8,924,712 B2   12/2014  Varadarajan et al.
(Continued)

FOREIGN PATENT DOCUMENTS

WO    WO-2014022778 A1 *  2/2014    ........... G06F 21/606

OTHER PUBLICATIONS

Jones et al ("Jones," JSON Web Token, Internet Engineering Task Force (IETF), Request for Comments: 7519, May 2015, pp. 1-30). (Year: 2015).*

(Continued)

*Primary Examiner* — Luu T Pham
*Assistant Examiner* — James J Wilcox
(74) *Attorney, Agent, or Firm* — Trellis IP Law Group, PC

(57) ABSTRACT

An example system and method facilitates establishment of secure communications between software systems, e.g., a client computing device and one or more servers (e.g., a cloud) using Multi Factor Authentication (MFA) via strategic use of tokens. An example method for overcoming longstanding security loopholes and usability issues with conventional MFA methods includes efficiently securing registration code (e.g., via public key cryptography and tokens) and exchanged data (e.g., message payloads), in part by embedding a signed token (e.g., a JWT token signed by a private key of the server system) in a registration link used by a client system to communicate with one or more servers of a server system.

18 Claims, 7 Drawing Sheets

(51) Int. Cl.
*H04L 9/32* (2006.01)
*H04W 12/06* (2021.01)
*H04L 9/08* (2006.01)
*H04L 9/06* (2006.01)

(56) References Cited

U.S. PATENT DOCUMENTS

| | | | |
|---|---|---|---|
| 9,331,990 B2* | 5/2016 | Le Saint | H04L 63/12 |
| 9,374,369 B2 | 6/2016 | Mahaffey et al. | |
| 9,547,756 B2 | 1/2017 | Durbha et al. | |
| 9,635,011 B1* | 4/2017 | Wu | H04L 9/0861 |
| 10,021,085 B1* | 7/2018 | Wu | H04L 63/0428 |
| 10,257,161 B2* | 4/2019 | L. | H04L 63/00 |
| 10,382,445 B1* | 8/2019 | Mantel | G06Q 20/227 |
| 10,511,587 B2* | 12/2019 | Brockhaus | H04L 63/0823 |
| 10,735,356 B1* | 8/2020 | Mantel | G06Q 20/10 |
| 2003/0172269 A1* | 9/2003 | Newcombe | H04L 29/06 713/168 |
| 2005/0044393 A1* | 2/2005 | Holdsworth | G06F 21/34 726/26 |
| 2007/0130473 A1* | 6/2007 | Mazotas | H04L 63/083 713/183 |
| 2007/0186106 A1* | 8/2007 | Ting | H04L 63/0815 713/168 |
| 2012/0240048 A1* | 9/2012 | Fortier | H04L 41/022 715/736 |
| 2014/0136837 A1* | 5/2014 | Baylina Mele | H04W 12/069 713/155 |
| 2014/0189808 A1* | 7/2014 | Mahaffey | H04L 63/083 726/4 |
| 2014/0304786 A1* | 10/2014 | Pei | H04L 63/0876 726/6 |
| 2015/0124969 A1* | 5/2015 | Wong | G06F 21/606 380/281 |
| 2015/0150109 A1 | 5/2015 | Bocanegra et al. | |
| 2015/0181080 A1* | 6/2015 | Nuggehalli | H04N 1/00244 358/1.15 |
| 2015/0237038 A1* | 8/2015 | Grajek | H04L 67/10 726/8 |
| 2015/0237039 A1* | 8/2015 | Grajek | H04L 67/02 726/8 |
| 2015/0237049 A1* | 8/2015 | Grajek | H04L 63/0815 726/7 |
| 2015/0244706 A1* | 8/2015 | Grajek | H04L 63/0815 726/6 |
| 2016/0087933 A1* | 3/2016 | Johnson | H04L 67/34 709/245 |
| 2016/0127352 A1* | 5/2016 | Xu | H04L 63/0807 726/8 |
| 2016/0191493 A1* | 6/2016 | Bowman | H04L 63/083 726/9 |
| 2016/0269403 A1 | 9/2016 | Koutenaei et al. | |
| 2016/0294809 A1* | 10/2016 | LeSaint | H04L 9/3263 |
| 2016/0321652 A1* | 11/2016 | Dimmick | G06Q 20/401 |
| 2017/0244558 A1* | 8/2017 | Le Saint | H04L 9/3226 |
| 2017/0257363 A1* | 9/2017 | Franke | H04W 12/068 |
| 2017/0264599 A1* | 9/2017 | O'Regan | G06F 21/32 |
| 2017/0272316 A1* | 9/2017 | Johnson | G06Q 10/103 |
| 2017/0346851 A1* | 11/2017 | Drake | H04L 63/0428 |
| 2018/0124039 A1* | 5/2018 | Grajek | H04L 63/0807 |
| 2018/0310142 A1* | 10/2018 | Samdani | H04W 4/14 |
| 2018/0330368 A1* | 11/2018 | Slupesky | G06Q 20/38215 |
| 2020/0127891 A9* | 4/2020 | Johnson | H04L 67/125 |

OTHER PUBLICATIONS

Shamal et al "Secure Authentication for Online Banking using QR Code," International Journal of Emerging Technology and Advanced Engineering, ISSN 2550-2459, ISO 9001:2008 Certified Journal, vol. 4, Issue 3, Mar. 2014, pp. 778-781 (Year: 2014).*

Mukund Sarma—Second Level Authentication Using QR Codes http://www.irphouse.com/ijcis/ijcisv5n1-2_05.pdf International Journal of Computer and Internet Security.; ISSN 0974-2247 vol. 5, No. 2 (2013), pp. 43-50 © International Research Publication House.

Azure Active Directory integration with MDM https://docs.microsoft.com/en-us/windows/client-management/mdm/azure-active-directory-integration-with-mdm 39 pages.

Adaptive Multi-Factor Authentication https://www.centrify.com/products/application-services/adaptive-multi-factor-authentication/methods/ 3 pages.

* cited by examiner

DATA EXCHANGE DURING MULTI FACTOR AUTHENTICATION

BACKGROUND

The present application relates to computing, and more specifically to software and accompanying systems and methods for facilitating authentication of a computing device for access to computing resources of a server.

Systems and methods for facilitating authentication of a client device and associated user for access to secured computing resources are employed in various demanding applications, including implementation of secure online banking functionality, enterprise cloud services involving client-server exchange of private data, and so on. Such applications often demand user friendly and highly secure mechanisms and methods, such as Multi Factor Authentication (MFA) methods, for preventing unauthorized access to user data.

Conventionally, MFA methods may employ server-side generation of a One Time Password (OTP). The OTP is then sent to a user's mobile device, e.g., via a Short Message Service (SMS) message (also called a text message herein). The user then provides the OTP password, in addition to other login credentials (e.g., username and password) to a server login page, to thereby enable access to the protected computing resources that the authenticated user has permissions to access.

However, use of conventional MFA methods relying upon use of OTPs often exhibit several shortcomings, including requiring the user to have immediate access to their mobile device; a server must employ additional computing resources to manage the generation and dispersal of the OTPs; server-side OTP logic typically requires use of additional memory, e.g., cache maintained in a persistent layer on the server; OTPs must often be strictly time bound to ensure reliability, and so on. Such requirements can be costly for companies providing server-side data and functionality for customers.

An alternative to use of OTP for MFA, involves forcing a user to enter potentially lengthy login credentials from a pre-authenticated device for each server-side system that the user wishes to access. This may involve requiring the user to frequently enter their login credentials to access different server-side systems offered by a particular provider. Multiple logins can be particularly problematic when users are accessing the systems (e.g., which may implement different cloud services) from mobile devices with small screens, where typing can be inconvenient and error prone.

Alternatively, certificates may be used to facilitate MFA. In such systems, client devices are pre-provisioned with certificates (e.g., by requiring that users install certificates on their devices) before users employ the client devices to log into one or more server systems. However, provisioning certificates to different types of client devices can also be time consuming, costly, and error prone.

SUMMARY

An example method facilitates establishment of secure communications between software systems, e.g., a client computing device and one or more servers (e.g., a cloud) using Multi Factor Authentication (MFA) via strategic use of tokens. The example method includes receiving a first signal from a first computing system (e.g., a client device), the first signal including login information for logging into a second computing system (e.g., a server system); employing the second computing system to process the login information and generate a token and a registration link in response thereto; embedding the token into the registration link; forwarding the registration link to the first computing system; detecting, by the second computing system, one or more request messages from the first computing system, requesting to access one or more computing resources of the second computing system, wherein the one or more request messages include the registration link; authenticating the one or more request messages, yielding an authenticated one or more request messages in response thereto; and employing the second computing system to selectively fulfill the request message for the first computing system in accordance with the authenticated one or more request messages.

In a more specific embodiment, authentication of the one or more request messages involves use of Public Key Infrastructure (PKI), i.e., software for using a client-generated public key to confirm that a signed payload of the request message has been signed (using the private key corresponding to the public key) by the client device that is issuing the request message.

The specific example method further includes representing the registration link as a Quick Response (QR) code or as plain text, which is signed (e.g., via a certificate and/or server private key) by the second computing system. The token further specifies audience and issuer claims; specifies an expiry time of the token, and so on. In this embodiment token is implemented as a JavaScript Object Notation Language (JSON) Web Token (JWT).

The second computing system includes a server system that includes one or more authentication servers and one or more application servers. The first computing system includes a software authentication device that further includes or represents a mobile computing device (also called a client device herein) and one or more accompanying authentication modules. The first computing system includes a local session storage and/or one or more cookies for storing the registration link, e.g., as a QR code (or processed version thereof) received from the second computing system.

The first computing system further includes a key chain for storing a private key of a pair of private and public keys generated by an authentication module of the first computing system. The first computing system includes software (e.g., as may be incorporated into the authentication module) for signing a request message payload using the private key. The request message payload, which may include data of the JWT token, is sent to the second computing system using one or more request messages. The one or more request messages request server registration or enrollment to thereby subsequently facilitate client access to one or more computing resources of an application server associated with the second computing system, e.g., via client-side generation of One Time Passwords (OTPs); via acceptance of server-issued push notifications to allow client access to protected computing resources, and so on. The OTPs and received push notifications represent additional authentication factors usable for MFA when employing a client device to access highly secure resources, i.e., computing resources that demand use of MFA.

The second computing system uses a public key of the first computing system (i.e., client device) to confirm that the request message payload has been signed by a holder of the private key (i.e., the first computing system and accompanying authentication module) corresponding to the public key. The second computing system may use the public key to confirm that the request message payload has not been corrupted or tampered with, and also to confirm that the issuer (i.e., the first computing system) of the request message is the holder of the private key that is associated with the client-side authentication module and accompanying user-supplied credentials used to initially obtain the registration link from the second computing system.

The second computing system analyzes audience and issuer claims of the token (included with the request message and associated registration link) to verify that the sender (i.e., first computing system) of the one or more request messages is the appropriate audience as indicated in the one or more request messages and associated registration-link tokens, and to further verify that the issuer claim of the token refers to a computing resource to which the first computing system is authorized to access.

Hence, various embodiments discussed herein may overcome security loopholes and usability issues via a user friendly authentication process (for authenticating client devices and associated users) involving efficiently securing registration code (e.g., via public key cryptography and tokens) and exchanged data (e.g., message payloads).

By embedding a signed token (e.g., a JWT token that includes a certificate of a token-issuing server and is further signed by a private key of the client device) in the registration link, this helps to ensure, in part, that a client device that has not successfully initially logged into the server system to obtain the token (and associated registration link) cannot access protected data and/or functionality associated with the initial login credentials.

Additional layers of security afforded by use of the JWT token, including enabling the server to process the unique server-generated authentication device IDentification (ID); user ID, expiry time for a given JWT token; JWT token issuer claim (identifying the server issuing the JWT token); JWT token audience claims (identifying the client device to receive the JWT token), and so on—all to ensure that a given client device is associated with the initial client login (and associated login credentials), i.e., registration or enrollment, and is authorized to access server-side data and functionality associated therewith, e.g., via use of OTPs, acceptance of push notifications for authentication purposes, and so on.

Note that when a request message is sent by a client device to the server system, the server system further validates the request message (and associated payload) using the public key generated by the client device, before proceeding to further process and service the request message. The client device (first computing system) may share its public key with the second computing system (e.g., server) upon initial contact, i.e., when an initially unregistered client device seeks a registration link to enable client-device enrollment and authorization to generate OTPs that are usable to access other server-side computing resources.

Accordingly, various embodiments discussed herein may provide substantial benefits over and beyond various conventional MFA mechanisms and methods, including obviating the need for server-side generation of a One Time Password (OTP) and associated verification logic; avoiding the need for generation and distribution of certificates to client devices; mitigating the need for multiple logins; enhancing security, in part by providing for multiple checks on different JWT token claims, including validity, issuer, and audience claims, and by enabling an additional check on the request messages that involves verifying the validity of the digital signature (using a private key) used by the client device to sign the request message.

A further understanding of the nature and the advantages of particular embodiments disclosed herein may be realized by reference of the remaining portions of the specification and the attached drawings.

DETAILED DESCRIPTION OF EMBODIMENTS

Figure 1:
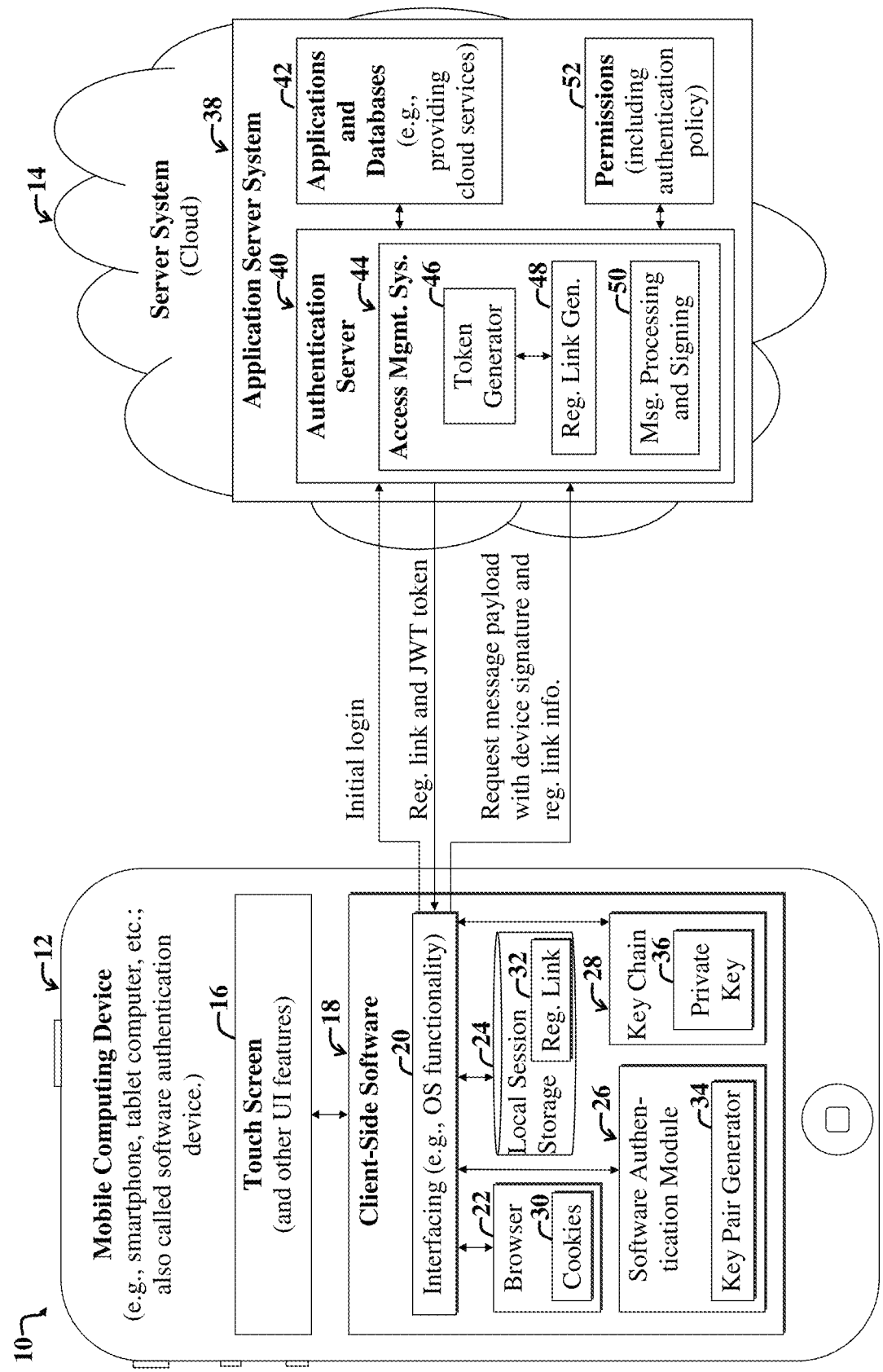
FIG. 1 illustrates a first example system and accompanying computing environment employing Multi Factor Authentication (MFA) to enable client access to server-side computing resources.

Conventionally, software developers, configuration managers, deployment managers, and other users of a computing environment may subscribe to certain cloud services to facilitate development, configuration, and deployment of software applications and storage of associated files. A cloud service that is configured for software application or process flow development, management, and/or deployment is called a Process Cloud Service (PCS) herein.

For the purposes of the present discussion, a server may be any computing resource, such as a computer and/or software that is adapted to provide content, e.g., data and/or functionality, to another computing resource or entity that requests it, i.e., the client. A client may be any computer or system, including software system that is adapted to receive content from another computer or system, called a server. A server system may be any collection of one or more servers and accompanying computing resources. The terms "client device" and "client" may be employed interchangeably herein, however, depending upon the context in which the term is used, the term client may refer more generally to both client devices and client software.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on. Examples of computing resources include data and/or software functionality offered by one or more web services, Application Programming Interfaces (APIs), etc.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A given software application may include (but not necessarily) constituent software applications or modules (e.g., services, functions, procedures, computing objects, etc.). Accordingly, the term "software application" may also include networked software applications or integrated groups thereof.

For the purposes of the present discussion, a software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

For the purposes of the present discussion, a web service may be any computer code and associated functionality that is adapted to be called by an application or other service or process whose code is stored in a separate location (e.g., on another computer or memory storage location or device) from the web service. Accordingly, the term "service" as used herein is relatively broad and may include remotely accessible APIs and services characterized by Web Services Description Language (WSDL) interfaces, Simple Object Access Protocol (SOAP), REpresentational State Transfer (REST), YAML (Yet Another Markup Language), and/or other types of interfaces.

Generally, web services, also simply called services herein, provide functionality, e.g., capabilities, that may be reused by different applications, processes, or web services (that may be distributed across a network), which access the functionality via a service interface (e.g., WSDL interface) consistent with a description of the web service. A web services model may represent a loosely coupled integration model for allowing flexible integration of various network-distributed applications or processes.

For clarity, certain well-known components, such as hard drives, processors, power supplies, routers, Internet Service Providers (ISPs), workflow orchestrators, process schedulers, identity management clouds, process clouds, certificate authorities, business process management systems, and so on, are not necessarily explicitly called out in the figures. However, those skilled in the art with access to the present teachings will know which components to implement and how to implement them to meet the needs of a given implementation.

FIG. 1 illustrates a first example system 10 and accompanying computing environment employing Multi Factor Authentication (MFA) to enable client access, i.e., access to a client device 12, to server-side computing resources, e.g., data and functionality provided by server-side applications and databases 42. For the purposes of the present discussion, MFA may refer to any authentication method that employs multiple factors, e.g., OTPs, answers to security questions, etc., beyond conventional credentials (e.g., username and/or password).

The overall system 10 may represent a networked computing environment, such as a networked enterprise computing environment. Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

The example system 10 includes an example mobile computing device 12, e.g., a smartphone, tablet computer, laptop, etc., in communication with a server system 14, also called a cloud herein, via a network, such as the Internet. Note that embodiments are not limited to use of mobile computing devices as clients of the server system 14. For example, desktop computers, may act as clients of other servers.

The example mobile computing device 12, also called the client device or the authentication device herein, includes a touch screen 16 for displaying User Interface (UI) display screens and providing associated user access to functionality afforded by accompanying client-side software 18. The client-side software 18 includes interfacing functionality 20 in communication with a browser, a software authentication module 26, a key chain 28, and a local session storage 24.

The browser 22 may include or be associated with browser cookies 30, which may be used to store a registration link, as discussed more fully below. Similarly, a local session storage mechanism, e.g., database 24, may be used to store a registration link 32.

In the present example embodiment, the software authentication module 26, which may also be called a mobile authenticator application (or "app") includes or is otherwise in communication with a key pair generator 34, which includes code for generating a public key and a private key, called a key pair herein. The key pair generator 34 may employ underlying Public Key Infrastructure (PKI) to generate the key pairs in accordance with conventional public key cryptography and associated methods for generating such key pairs. Those skilled in the art with access to the present teachings may readily implement or purchase a key pair generator to meet the needs of a given implementation, without undue experimentations. For the purposes of the present discussion public key infrastructure may be any functionality (e.g., as may be implemented via computer code) usable to create and/or use public keys and private keys for the purposes of encryption and/or generation of digital certificates.

For the purposes of the present discussion, a public key may be any key or code that is publicly available and/or otherwise disseminated widely, or may be disseminated widely without compromising data protected by an associated private key. Public keys can be used to encrypt messages that can only be decrypted by the corresponding private keys that are paired with the corresponding public keys. A private key may be any key or code that is usable to decrypt a message that has been encoded using a public key. Generally, private keys, which are associated with corresponding public keys, are held in secret and used by the holder of the private key to decrypt messages that have been encoded with a public key.

The client-side software 18 includes a keychain 28, which facilitates maintaining an encrypted version of a private key 36 of a public and private key pair generated by the key pair generator 34. The private key 36 may be used to digitally sign request message payloads, e.g., by combining data of the message payload with the private key to yield a digital signature. The digital signature can be verified by one or more servers of the server system 14 using the public key of the mobile computing device 12, as discussed more fully below.

Note that in FIG. 1, various software modules, including the browser 22, the software authentication module 26, the local session storage 24, and the key chain 28 mechanisms may be interfaced via the interfacing module 20, which may include middleware for facilitating intercommunication between the modules 22-28. Furthermore, note that the interfacing module 20, which may include an operating system and/or associated functionality, may further include or leverage additional code (e.g., middleware other than basic operating system functionality) to facilitate intercommunications between the modules 22-28, as needed to meet the needs of a given implementation.

The client-side software 18 communicates with the server system 14, which includes one or more servers of an application server system 38. For the purposes of the present discussion, an application server may be any server that includes computing resources for running software applications that may provide data and/or functionality to one or more client devices. An application server may back one or more web pages running on one or more web servers, wherein the web pages facilitate providing UI controls to enable a user of the client device 12 to use the client device 12 to interact with functionality afforded by the underlying application server and applications and/or data running thereon and/or stored thereby.

The server system 14, which may represent a cloud (such as an integration cloud and/or process cloud) includes the example application server system 38, which includes an authentication server 40 in communication with one or more software applications 42, such as database management systems and associated databases used to provide server-side functionality, e.g., cloud services, to one or more clients, e.g., the mobile computing device 12.

For the purposes of the present discussion, an authentication server may be any server that provides functionality for authenticating credentials, e.g., usernames, passwords, and so on, of users and/or software programs (e.g., apps). An authentication server, e.g. the authentication server 40 of the application server system 38 may provide additional functionality, e.g., for referencing permissions 52 (which may include authorization policies) associated with a particular client device (and/or accompanying software) and ensuring that one or more cryptographical tickets or tokens provided to the mobile computing device 12 only enable access to server-side computing resources to which the mobile computing device 12 and associated user are authorized to access, i.e., have been permissioned to access, as indicated by the associated permissions 52.

The example authentication server 40 includes an access management system 44, which includes a token generator 46 in communication with a registration link generator 48. The access management system 44 further includes a message processing and signing module 50, which includes computer code for processing messages, e.g., incoming request messages, and/or outgoing messages specifying registration links. Accompanying message signing functionality enables an accompanying server to sign a message, e.g., a message containing a token and/or associated registration link, with a private key of the server 40 used to implement the signing. The private key of the server 40 (and associated message signing) may be implemented via a server certificate that may be issued to the server 40 via a certificate authority of the server system 14.

Note that the server-side message processing and signing module 50 may include additional functionality and modules that are not necessarily called out in FIG. 1, e.g., a certificate authority, a key pair generator and associated PKI usable to sign messages, and so on.

The applications and databases 42 may communicate with the authentication server 40. The applications and databases 42 may also communicate with client devices, e.g., the mobile computing device 12, which have been authenticated to access protected computing resources, e.g., data and/or functionality, provided via the applications and databases. Note that in the present example embodiment, the client-side authentication module 26 is first registered or enrolled with the authentication server 40, e.g., to confirm its authenticity (and that of the associated device 12 and user), before it is allowed to generate OTPs (or accept push notifications to enable user acceptance of access authorizations) for use as a factor in MFA methods used by one or more of the applications and databases 42 before enabling client access to data and/or functionality associated therewith.

In the present example embodiment, communications between the mobile computing device 12 and the applications and databases 42 are, at least initially routed through the authentication server 40, which verifies that the mobile computing device 12 that is requesting access to resources provided by the applications and databases 42 is both authentic and is permissioned to access requested resources (e.g., by providing OTPs and/or accepting push notifications for authorizations). The client device 12 and associated software authentication module 26 may first request registration/enrollment with the authentication server 40 (as requested via one or more request messages sent by the mobile computing device 12 to the server system 14) before being allowed to generate valid OTPs or to accept push-notifications to facilitate MFA (to access a protected resource), as discussed more fully below.

In an example scenario, a user employs the mobile computing device 12 and accompanying browser 22 to browse to a Uniform Resource Locator (URL) associated with a login page of the authentication server 40 used for logging into the application server system 38. Once the browser 22 displays the login page, a user may enter credentials therein. Example credentials include a username and password.

If the software authentication module 26 that has been installed on the mobile computing device 12 (e.g., as an app downloaded from an app store) has not yet been registered or enrolled with the authentication server 40, the authentication server detects this condition, and then prompts the user to continue with registration (also called enrollment herein) of the authentication module 26.

The authentication server 40 then employs the accompanying access management system 44 and accompanying token generator 46 and registration link generator 48 to generate a token and registration link, as discussed more fully below with reference to FIG. 2. In the present example embodiment, the token generator 46 generates a JavaScript Object Notation Language (JSON) Web Token (JWT). The generated JWT token includes information obtained from the mobile computing device and associated messages received by the authentication server 40, such as user ID and audience claim. The audience claim specifies an intended recipient of the JWT token to be generated by the token generator 46.

The generated JWT token includes additional information that may be derived by the access management system 44, including an issuer claim identifying the particular server that generates the JWT token; expiry time specifying for how long the token will be usable; and a server certificate. The server certificate may be implemented via a digital signature or digital certificate of the authentication server 40. The digital signature of the authentication server may be computed using a private key of the authentication server 40 and the body of the token and/or registration link in which the token is to be embedded, before the registration link is forwarded to the client device 12. Note that the digital certificate may be appended to (or otherwise included in) a subsequent registration link forwarded to the client device 12 upon successful login and verification of the authenticity of the installed software authentication module 26 and verification that the software authentication module 26 and accompanying mobile computing device 12 conform to a predetermined authentication policy, as discussed more fully below.

For the purposes of the present discussion, a registration link may be any set of data that specifies a URL or Uniform Resource Identifier (URI) that a user may browse to access one or more computing resources for enabling registration or enrollment of a mobile computing device and associated software authentication module (e.g., the authentication module 26 of FIG. 1). The example registration links discussed herein further include the JWT token embedded therein and further include information specifying particular permissions 52 (e.g., authorization policies) that have been allocated to the mobile computing device 12 and associated authentication module 26. The permissions may also specify which data and/or functionality (e.g., data and functionality available via the applications and databases 42) that the mobile computing device 12 and associated user are allowed to access and use.

However, in the present example embodiment, the authentication policy can be particularly useful for providing a mechanism whereby a tenant administrator (e.g., who administrates multiple client devices, such as the client device 12) can specify specific policies applicable to the authentication modules 26 and associated device 12. For example, an authorized tenant administrator may login into the authentication server 40 and adjust an authentication policy so as to only enable the software authentication module 26 to be registered with the authentication server 40 if the accompanying operating system 20 is of a particular version. Each time the client-side authentication module 26 is run, it may perform a check with the authentication server to ensure that it is currently in compliance with the specified authentication policy 52 before it proceeds with generation of OTPs and/or acceptance of server push notification requests for authorization to access protected server-side computing resources.

Upon successful authentication of the user-supplied credentials during the initial login, the JWT token is generated by the token generator 46 and is embedded in a registration link that is generated by the registration link generator 48. The resulting registration link is forwarded to the mobile computing device 12 for subsequent use in accessing one or more protected computing resources of the server system 14, which, in this example scenario involves computing resources for enabling registration of the mobile computing device and accompanying authentication module 26 for later use in MFA to access data and/or functionality provided by the one or more applications and databases 42. For the purposes of the present discussion, a protected computing resource may be any computing resource that requires authentication and/or verification of permissions before allowing a client and associated user to access (or otherwise use) data and/or functionality provided by the computing resource.

The client-side software 18 then receives the registration link from the authentication server 40 and renders it via a Quick Response (QR) code, or alternatively, in plain text or via another mechanism (e.g., bar code, etc.). In the present example embodiment, the browser 22 renders the registration link as a QR code using the browser 22. The QR code may be displayed in the touch screen 16. The displayed QR code may be scanned or otherwise screen captured. Data in the QR code may be encrypted, e.g., via URL encoding (e.g., percent encoding).

The resulting scanned or captured QR code may then be input into the client-side software authentication module 26. Alternatively, transfer of the QR code occurs directly between the browser 22 and the software authentication module 26. The scanned (or otherwise input) QR code representing the registration link received from the server system 14 may be stored as the registration link 32 in local session storage 24 and/or in one or more browser cookies 30. In the present example embodiment, the JWT token included in or represented by the QR code (corresponding to the registration link 32) is set to expire relatively quickly, e.g., in less than one minute. The expiry time helps to add an additional layer of security to inhibit or prevent any attempts at unauthorized use of the QR code and associated registration link 32.

The software authentication module 26 uses the key pair generator 34 and associated functionality to not only generate a private and public key, but to digitally sign request messages (e.g., that request registration of the authentication module 26 and associated client device 12 with the authentication server 40) sent to the application server system 38. In the present example embodiment, the request messages include the registration link 32 and a request message payload that has been digitally signed using a private key output by the key pair generator 34. The request message payload may include the same information that is in the JWT token initially returned from the authentication server 40 to the client device 12.

The authentication server 40 of the server system 14 may use the published client public key (i.e., given to the authorization server 40 upon initial contact) associated with the private key (generated by the key pair generator 34 and used to sign the request message payload) to not only confirm that the request message received by the authentication server 40 has not be corrupted or otherwise tampered with, but to ensure that the client device 12 that has sent the request message (and signed it with its private key) is also the client device identified via the JWT token (e.g., via the audience claim thereof) included in the request message.

Once a particular request message has been processed by the access management system 44 and accompanying message processing and signing module 50, the request message may be serviced. The processing includes verification of the information included in the JWT token of the registration link; confirmation that the request message has been signed by a valid private key associated with mobile computing device 12, and so on, as discussed more fully below. Servicing of the request message may involve successfully registering or enrolling the authentication module 26 and associated client device 12 for use of OTPs and/or push notifications, to thereafter facilitate client access to one or more protected resources of the applications and databases 42 in accordance with one or more permissions associated with the client device 12 and associated user, as may be confirmed and enforced by the access management system 44 with reference to the permissions module 52.

Note that in the present example embodiment, the mobile computing device 12 is called an authentication device, as it includes software authentication module 26 that is usable to facilitate authentication (e.g., Multi Factor Authentication (MFA)) during interaction with the server system 14.

In summary, to overcome various long standing security loopholes and usability issues with conventional MFA systems and methods, a JWT token is embedded in a registration link forwarded to the client device 12. The JWT token includes various claims, including user ID, authentication device ID (which may be generated server side), token expiry time, an issuer claim, and an audience claim. Use of the JWT token and associated QR code used to encode the JWT token and registration link, provide a user-friendly mechanism for facilitating enrollment of the client device 12 for subsequent use in MFA, e.g., by enabling the authentication module 26 to subsequently generate valid OTPs and accept push notifications that act as an additional factor usable to implement MFA logins to access server-side resources (e.g., including resources provided by the applications and databases 42).

The registration link 32 is generated using a server Uniform Resource Locator (URL) (identifying a URL for the server which hosts the resources to be accessed by the client device 12), a server-signed JWT token, and a specification of the authentication policy applicable to the particular client device 12 and associated user (as associated with the user-supplied login credentials). The authentication policy may detail particular user permissions to access data and functionality of the applications and databases 42 and/or other policy criteria governing use of the authentication module 26 on the client device 12.

The registration link is signed by a server, e.g., the authentication server 40, which has generated the registration link. The signature may include a server certificate, which may represent a private key of the authentication server 40. The server's private key and/or associated certificate may be provided via one or more certificate authorities that are in communication with the authentication server 40.

The client device 12 then contacts the server system 14 using the URL provided in the registration link, along with the associated JWT token. The recipient server, e.g., the authentication server 40 then validates the claims of the JWT token; confirms that the JWT token and/or associated request message (that includes the registration link) has not been tampered with (e.g., using the public key of the client device 12); confirms that the private key used to sign the request message corresponds to the client device 12 represented by the audience claim of the JWT token, and so on, as discussed more fully below.

Note that the client device 12 generates public private key pairs (e.g., via the key pair generator 34), and stores the private key 36 in the keychain 28. The client device 12 signs server request payloads (i.e., payloads of request messages sent by the client device 12 to the authentication server 40) using the generated private key. The server system 14 validates request messages from the client device 12 using the public key of the client device 12, before further processing of the request messages.

Initially, the authentication server 40 generates the JWT token, e.g., via the token generator 46. The JWT token is then signed by the authentication server 40 (e.g., using the server's certificate), and the signature is appended to the registration link. The registration link is then provided to the client device 12, e.g., via the browser 22. The browser 22 then renders the link as a QR code or in plaintext.

The user then scans the QR code, or otherwise opens the registration link directly in the client device 12. The client device 12 then uses the software authentication module 26 to process the registration link, e.g., parse the link. The resulting processed registration link is then usable by the client device 12 to contact the server system 14, via a request message, with the information in the registration link. The contact may involve sending a request message from the client device 12 to the server system 14. The client device 12 uses the private key generated by the client-side key pair generator 34 to sign a request message payload sent to the server system 14.

The server system 14 then processes, e.g., parses, the request message from the client device 12. The processing of the request message includes validation of the accompanying JWT token; validation of the client signature using the public key (which is provided in the payload of the request message); and storage of the public key for later use, if validation of the JWT token and client signature succeeds.

In the present example embodiment, server side validation of the JWT token in request message from the client device 12 includes JWT token and/or payload signature validation to ensure data has not been altered in transit; expiry time check to invalidate older (i.e., expired) registration links; verification that the audience claim of the JWT token matches the client device 12 and associated user; verification that the issuer of the JWT token is an authorized token issuer; and verification that the user-supplied credentials and associated device identification information match previously registered server data.

Upon successful device registration and authentication, the client device 12 device can begin generating time-limited passcodes (i.e., OTPs) for facilitating accessing server-side resources, and can accept the push notification requests from the server system 14 for authentication/authorization purposes.

Figure 2:
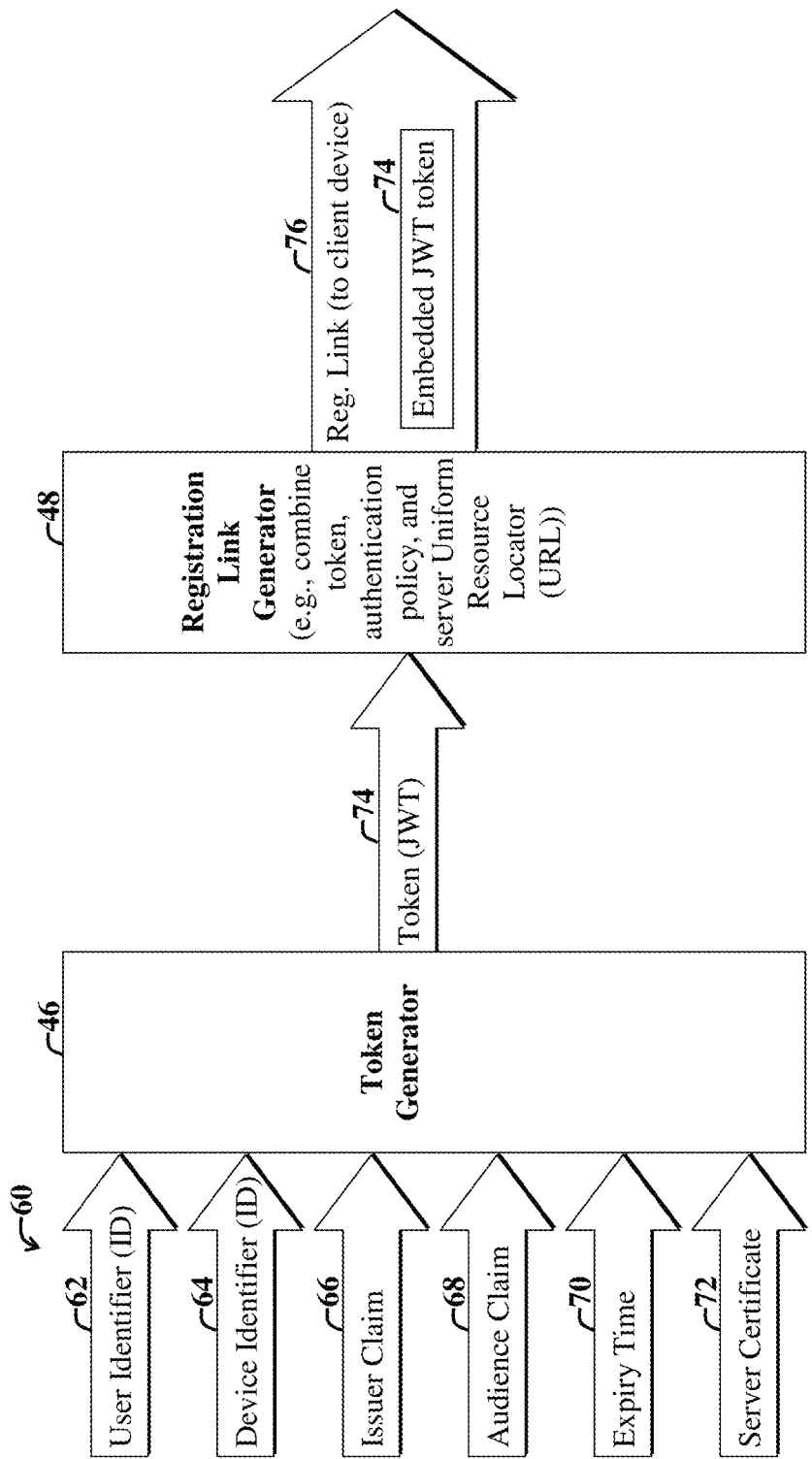
FIG. 2 illustrates example inputs and outputs of a token generator and registration link generator used by an authentication server of FIG. 1 to generate a registration link with an embedded token, e.g., a JavaScript Object Notation Language (JSON) Web Token (JWT).

FIG. 2 illustrates example inputs 60 and outputs 74, 76 of a token generator 46 and registration link generator 48 used by an authentication server 40 of FIG. 1 to generate a registration link 76 with an embedded token, e.g., a JavaScript Object Notation Language (JSON) Web Token (JWT) 74.

The token generator 46 receives as input a user ID 62, a server-generated (or otherwise server-maintained) client device ID 64, one or more issuer claim 66, one or more audience claim 68, a token expiry time 70, and a server certificate 72 (which may incorporate a server private key). The token generator 46 then combines the inputs to produce a JWT token. Note that those skilled in the art may readily implement JWT token generators (which may include using conventional, readily available JWT token generation functionality) to meet the needs of a given implementation, without undue experimentation.

The registration link generator 48 includes code for combining the JWT token; information describing an authentication policy (e.g., specifying one or more permissions applicable to a given client device and associated user); and server URL, wherein the server URL identifies a server for which the client device 12 is to establish a session, e.g., for registration or enrollment of the client device 12 and associated authentication module 26 for the purposes of enabling authentication module 26 to facilitate subsequent user access (e.g., via MFA) to one or more protected server-side computing resources, including data or functionality associated therewith or used thereby.

The resultant registration link 76 and accompanying embedded JWT token 74 is then forwarded to the client device 12 of FIG. 1 for further use in accessing one or more protected computing resources.

Figure 3:
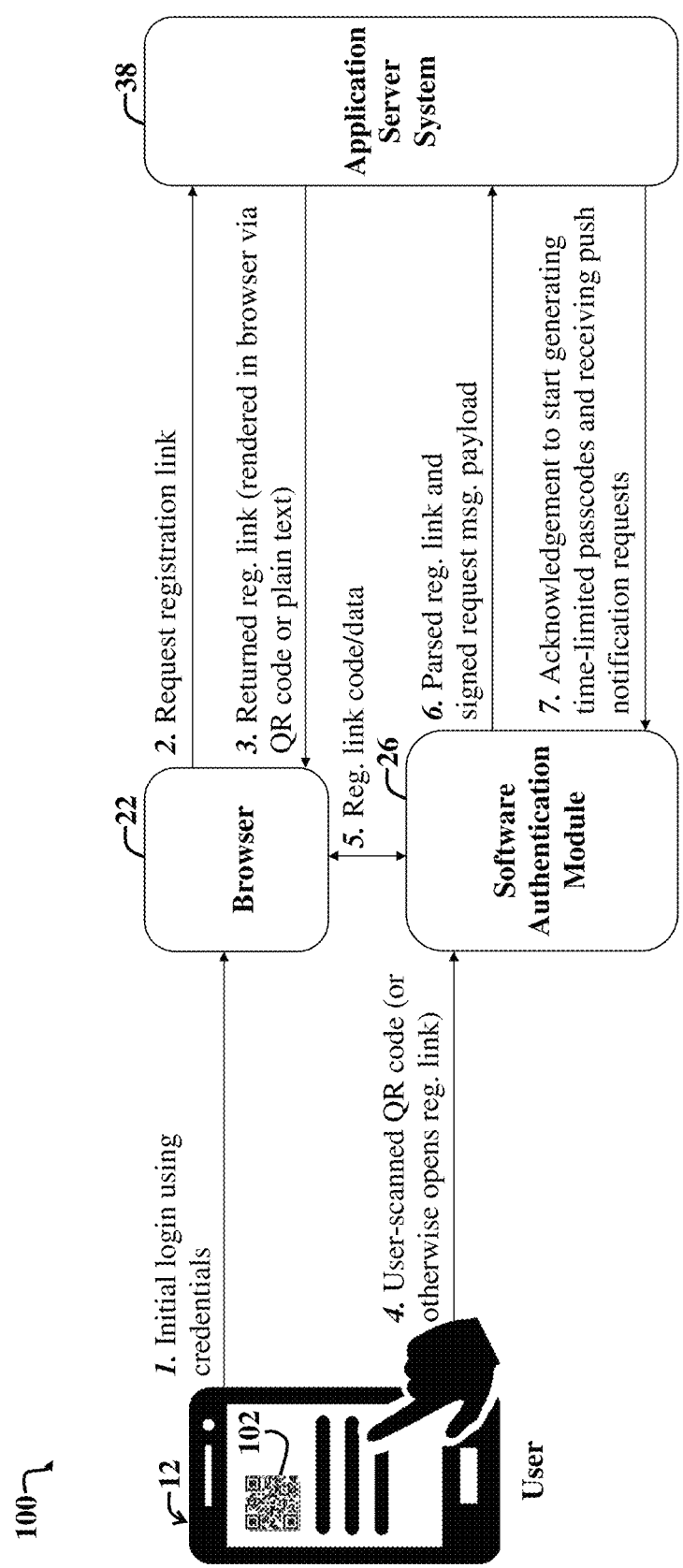
FIG. 3 illustrates example message flows between selected modules of the first example system of FIG. 1 to facilitate MFA according to one embodiment.

FIG. 3 illustrates example message flows 100 between selected modules of the first example system 10 of FIG. 1 to facilitate MFA according to one embodiment. A first example message (1.), which contains initial user login credentials, is sent from the client device 12 to the browser 22, e.g., when a user attempts to access one or more protected computing resources. The user has employed the browser 22 to browse to the application server system 38 and display a page whereby the user may enter their login credentials. The authentication server 40 may process the credentials and detect that the associated authentication module 26 has yet to register for MFA.

In a second message (2.), the browser 22 requests a registration link from the application server 38. This involves the browser 22 contacting the application server 38, so as to obtain an MFA registration link. The application server 38 then generates a unique device ID and the JWT token that includes various details, including logged in user ID, unique device ID, token expiry time, an issuer claim, and an audience claim. The generated JWT token is signed by the by the application server 38 using a certificate of the application server 38. The signature is appended to a resulting registration link (3.).

In the present example embodiment, the resulting registration link (upon successful initial authentication of the client device 12 and associated user) is returned to the browser 33 via a third message (3.). The browser 22 then renders the received registration link as a QR code 102, which is displayed via the client device 12. Note that in alternative embodiments, the registration link may be displayed as plain text, e.g., as opposed to the QR code 102.

The user then scans the QR code and/or otherwise opens the registration link, thereby providing the registration link information to the software authentication module 26 via a fourth message (4.). Alternatively, the registration link data may be obtained by the software authentication module 26 directly from the browser 22, e.g., via a fifth message exchange (5.).

The software authentication module 26 then processes and signs the registration link and/or associated request message payload. The request message includes details of the registration link specified via the scanned QR code 102. Hence, the authentication module 26 parses the registration link, and then contacts the application server 38 with details in the link. The software authentication module 26 also generates key pairs and signs the request message payload with the generated private key.

In a seventh message (7.), the application server 38 returns an acknowledgement to the client-side software authentication module 26 after processing the request message (6.). The application server 38 processing includes parsing of the request message (6.) from the software authentication module 26; validation of the associated JWT token and client signature using the public key, which may be provided in the payload of the request message (6.). Once authentication of the client device 12 and associated user is successful, the application server 38 may store the public key of the client device 12 for future use.

Token validation processing may occur in the following order: Token signature validation to confirm that token data has not been modified or tampered with; expiry time check to invalidate any older registration links; confirmation that user and device claims match with previously stored server data; confirmation that issuer and audience claims are consistent with where the token is coming from and where it is being sent to are the intended issuer and audience, respectively. Once the client device registration is successful, client device 12 can begin generating time limited passcodes and can accept push notification requests from the application server 38 for subsequent authentication and/or authorization purposes.

Note that each time the client device 12 and accompanying browser 22 and authentication module 26 attempt to access a protected resource of the application server system 38, the authentication module 26 may check the server-side authentication policy (e.g., as maintained by the permissions module 52 of FIG. 1) to confirm that the software authentication module (e.g., mobile authenticator) 26 and accompanying device 12 meet the specifications of the current authorization policy. This allows authorized tenant administrators (e.g., administrators administering multiple client devices 12) control over the running of the authentication module 26 on particular devices. Alternatively, or in addition, the authorization-policy checks are run at specific time intervals, or on an as-needed basis.

Figure 4:
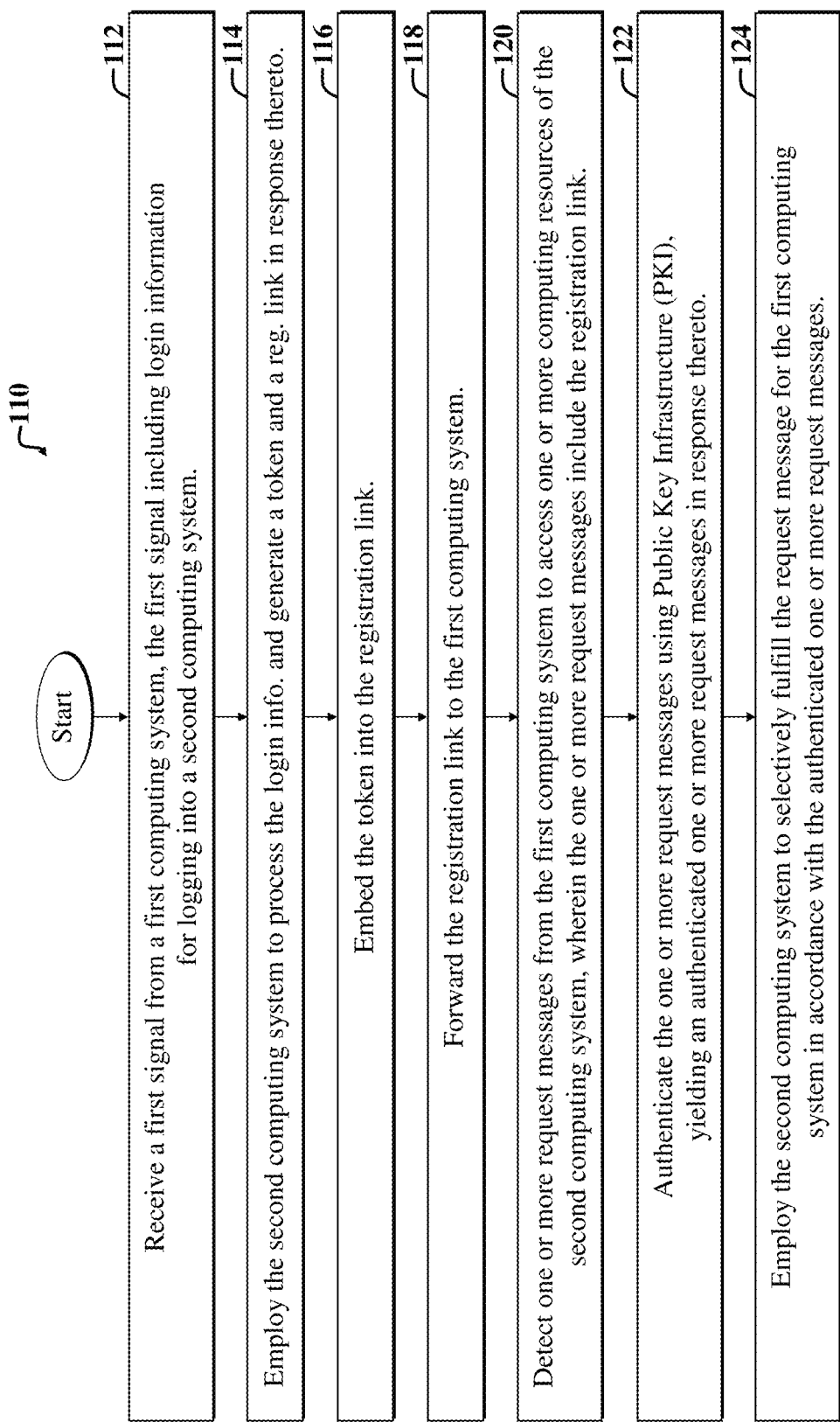
FIG. 4 is a flow diagram of a first example method implementable via the embodiments of FIGS. 1-3.

FIG. 4 is a flow diagram of a first example method 110 implementable via the embodiments of FIGS. 1-3. The first example method 110 facilitates establishment of secure communications between software systems.

With reference to FIGS. 1, 3 and 4, in initial receiving step 112 includes receiving a first signal (e.g., corresponding to the first message (1.) of FIG. 3) from a first computing system (e.g., the client device 12 of FIG. 1), wherein the first signal includes login information for logging into a second computing system (e.g., the server system 14 of FIG. 1).

A subsequent employing step 114 includes employing the second computing system to process the login information and generate a token (e.g., the JWT token 74 of FIG. 2) and a registration link (e.g., the registration link 76 of FIG. 2) in response thereto.

Next, an embedding step 116 includes embedding the token into the registration link (e.g., as shown in FIG. 2, where the JWT token 74 is embedded in the registration link 76).

A subsequent forwarding step 118 includes forwarding the registration link to the first computing system (e.g., the client device 12 of FIG. 1).

Next, a detecting step 120 includes detecting, by the second computing system, one or more request messages (e.g., the request message (6.) of FIG. 3) from the first computing system to access one or more computing resources (e.g., resources for facilitating registration or enrollment of the client device 12 to thereafter selectively enable access to resources of the applications and databases 42 of FIG. 1 after client submittal of credentials and an OTP or an acceptance of a push notification for logging into the server-side system providing access to the applications and databases 42) of the second computing system, wherein the one or more request messages include the registration link.

A subsequent authenticating step 122 includes authenticating the one or more request messages, yielding an authenticated one or more request messages in response thereto.

Next, an employing step 124 includes employing the second computing system to selectively fulfill the request message for the first computing system in accordance with the authenticated one or more request messages. Fulfillment of the request message may include registering the client device 12 of FIG. 1 for use in MFA processes used by servers charged with authenticating users for access to the applications and databases 42 of FIG. 1.

Note that the first example method 110 may be modified, without departing from the scope of the present teachings. For example, the first example method 110 may further specify use of Public Key Infrastructure (PKI) for enabling client-side generation of public and private key pairs, wherein the private key may be used by a client device (e.g., the client device 12 of FIG. 1) to sign request messages, e.g., request message payloads and/or accompanying JWT tokens embedded in a registration link accompanying the request message.

The first example method 110 may further include or specify representing the registration link as a Quick Response (QR) code or as plain text. The token may specify various details, e.g., issuer and audience claims, and expiry time of the token. The token may include or be implemented as a JWT token.

The first example method 110 may be altered to further specify that the second computing system includes a server system that includes one or more authentication servers (e.g., the server 40 of FIG. 1) and one or more application servers. The one or more authentication servers may run on the one or more application servers (e.g., comprising the server system 38 of FIG. 1).

The first computing system may represent or include a software authentication device that further includes a mobile computing device and one or more authentication modules (e.g., the software authentication module 26 or app of FIG. 1). The first computing system may include a local session storage (e.g., the local session storage 24 of FIG. 1) and/or one or more cookies (e.g., the cookies 30 of FIG. 1) for storing the registration link (e.g., as represented by the registration link 76 of FIG. 2 and the QR code 102 of FIG. 3) received from the second computing system.

The first computing system may further include a key chain (e.g., the keychain 28 of FIG. 1) for storing a private key (e.g., the private key 36 of FIG. 1) of a pair of private and public keys generated by an authentication module (e.g., the authentication module 26 of FIG. 1) of the first computing system.

The first computing system may include software (e.g., the software authentication module 26 of FIG. 1) for signing a request message payload using the private key. The request message payload (which may include a server-signed JWT token and accompanying registration URL) may be sent to the second computing system using one or more request messages. The one or more request messages request access to one or more computing resources of an application server (e.g., as represented by the application server system 38 of FIG. 1) associated with the second computing system.

The one or more request messages may include a message payload (that includes the JWT token) that is signed via a private key generated by the first computing system. The first example method 110 may further include employing the second computing system to use a public key of the first computing system to confirm that the payload has been signed by a holder of the private key corresponding to the public key.

The second computing system may use the public key to confirm that the message payload has not been corrupted or tampered with. The second computing system may analyze audience and issuer claims of the token, which is included in the one or more request messages, to verify that the sender of the one or more request messages is the appropriate audience as indicated in the one or more request messages, and to further verify that the issuer claims of the token refers to a computing resource to which the first computing system is authorized to access.

The second computing system may include an access management system that is configured to selectively sign the registration link using a signature of the second computing system. The server signature may be a certificate issued to the access management system (e.g., the access management system 44 of FIG. 1) by a certificate authority.

Figure 5:
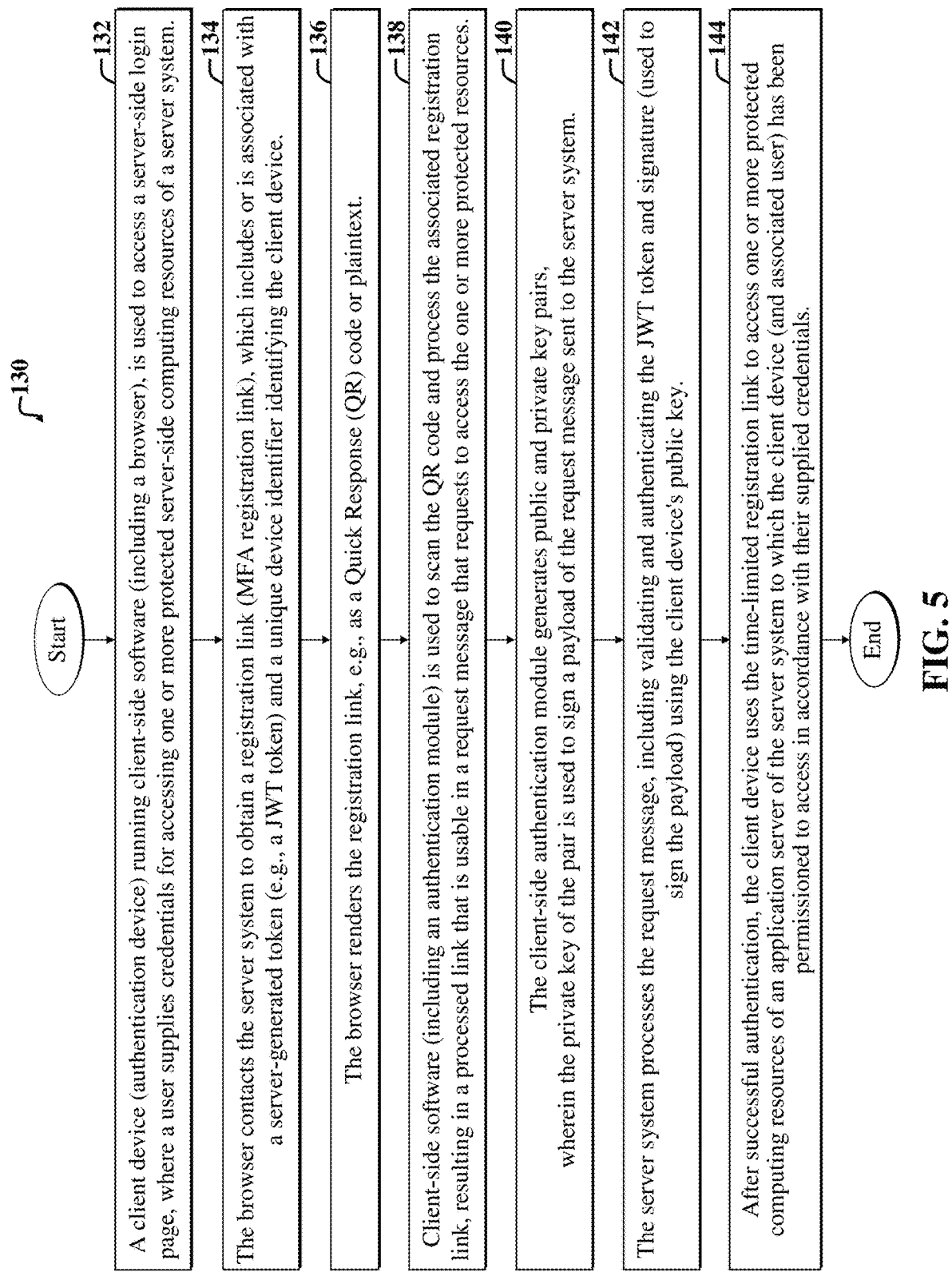
FIG. 5 is a flow diagram of a second example method implementable via the embodiments of FIGS. 1-3.

FIG. 5 is a flow diagram of a second example method 130 implementable via the embodiments of FIGS. 1-3. The second example method 130 includes a first step 132, which involves a client device (also called an authentication device when a software authentication module, e.g., the module 26 of FIG. 1, is installed thereon) running client-side software (including a browser), and used to access a server-side login page, wherein a user may supply credentials for accessing one or more protected server-side computing resources of a server system (e.g., the server system 14 of FIG. 1). Hence, the server (or server system) receives user login credentials that have been entered using a client-side browser to facilitate enabling a user access to one or more protected computing resources.

In a second step 134, a client-side browser communicates with the server system to obtain an MFA registration/enrollment link, which includes or is associated with a server-generated token (e.g., a JWT token) and unique device identifier identifying the client device. The JWT token may include various details, including information specifying: 1. Unique user ID of the logged in user. 2. Unique device ID of the client device. 3. Expiry time for the token and associated computing session to be established. 4. Issuer claims identifying the server that will be issuing the JWT token. 5. Audience claims identifying the recipient, i.e., the client of the JWT token.

In a third step 136, the browser renders the registration link, e.g., as a Quick Response (QR) code or plaintext.

In a fourth step 138, the client-side software (including an authentication module) is used to scan the QR code and process the associated registration link, resulting in a processed link that is usable in a request message that requests enrollment to facilitate access to access the one or more protected resources.

In a fifth step 140 the client-side authentication module generates public and private key pairs, wherein the private key is used to sign a payload of the request message sent to the server system.

In a sixth step 142, the server system processes the request message, including validating and authenticating the JWT token and signature (used to sign the payload) using the client device's public key, (which may be stored for later use upon successful authentication).

In a seventh step 144, after successful authentication, the client device may use the time-limited registration link (and associated time-limited passcodes) to register as a valid client device (with an associated authentication module) to facilitate access to one or more protected computing resources of an application server of the server system to which the client device (and associated user) has been permissioned to access in accordance with the supplied credentials.

Note that the second example method 130 may be modified, without departing from the scope of the present teachings. For example the eighth step may further specify that the client device selectively generates a time-limited passcode using the validated JWT token, wherein the client device may thereafter accept push notification requests for authentication and/or authorization purposes, as needed to access one or more protected computing resources of an application server of the server system.

Figure 6:
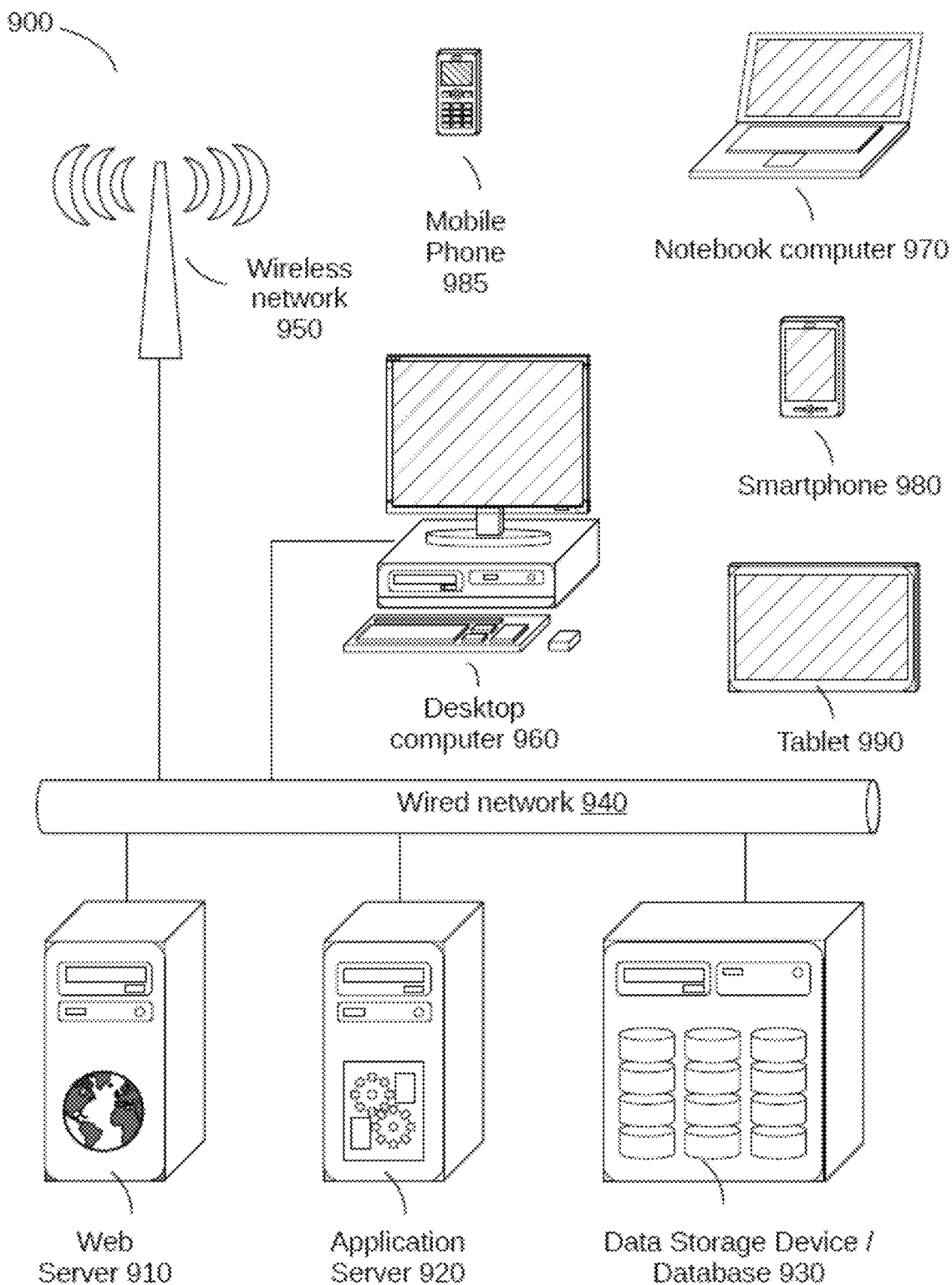
FIG. 6 is a general block diagram of a system and accompanying computing environment usable to implement the embodiments of FIGS. 1-5.

FIG. 6 is a general block diagram of a system and accompanying computing environment usable to implement the embodiments of FIGS. 1-3.

FIG. 6 is a general block diagram of a system 900 and accompanying computing environment usable to implement the embodiments of FIGS. 1-3. The example system 900 is capable of implementing the example computing environment 10 of FIG. 1 and accompanying methods of FIGS. 4-5. Embodiments may be implemented using standalone applications (for example, residing in a user device) and/or using web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIG. 1, the client device 12 of FIG. 1 may be implemented via one or more of the user computers 960-990 of FIG. 6. The server system 14 of FIG. 1 may be implemented via the wired network 940 and one or more of the accompanying web server (s) and application server(s) 920 of FIG. 6. Databases of the applications and databases 42 of FIG. 1 may be implemented via one or more of the data storage devices 930 of FIG. 6.

Note that the application server system 38 of FIG. 1 may include one or more application servers analogous to the application server(s) 920 of FIG. 6, e.g., for hosting the server-side applications and databases 42 of FIG. 1, and may further include one or more web servers 910, e.g., for providing login pages and other web pages to enable users of the client devices 12 of FIG. 1 to access data and functionality of the server system 14 of FIG. 1.

The authentication server 40 of FIG. 1 may run on the application server 920 of FIG. 6, and be fronted by a webpage that is hosted on a web server, e.g., the web server 910 of FIG. 6. While web servers are not particularly called out in FIG. 1, those skilled in the art with access to the present teachings will appreciate that the application server system may include one or more web servers for hosting web pages.

Figure 7:
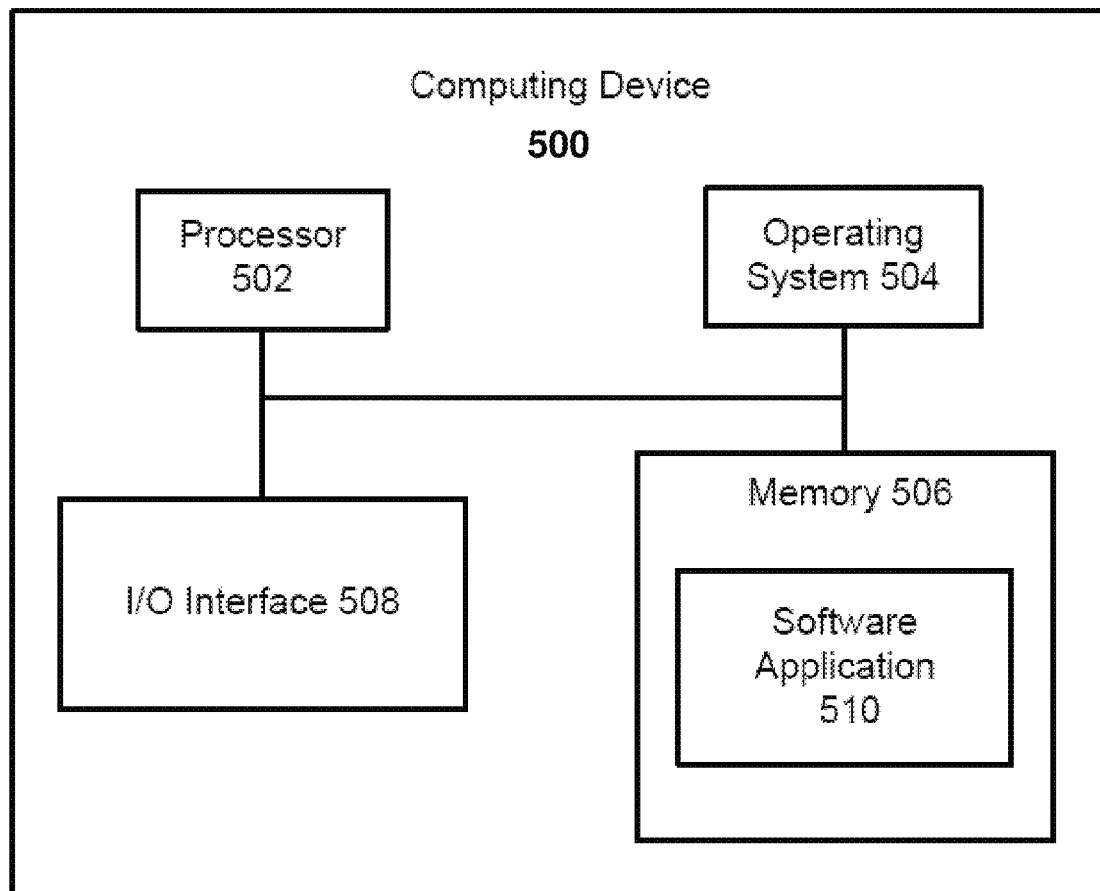
FIG. 7 is a general block diagram of a computing device usable to implement the embodiments of FIGS. 1-6.

FIG. 7 is a general block diagram of a computing device usable to implement the embodiments of FIGS. 1-3. While system 500 of FIG. 7 is described as facilitating performing the steps as described in certain implementations herein, any suitable component or combination of components of system 500 or any suitable processor or processors associated with system 500 may be used for performing the steps described.

FIG. 7 illustrates a block diagram of an example computing system 500, which may be used for implementations described herein. For example, computing system 500 may be used to implement server devices 910, 920 of FIG. 6 as well as to perform the method implementations described herein, e.g., to run the client device 12 and/or one or more of the server-side modules 40, 42, 52 of FIG. 1.

In some implementations, the computing system 500 may include a processor 502, an operating system 504, a memory 506, and an input/output (I/O) interface 508. In various implementations, the processor 502 may be used to implement various functions and features described herein, as well as to perform the method implementations described herein. While the processor 502 is described as performing implementations described herein, any suitable component or combination of components of the system 500 or any suitable processor or processors associated with the system 500 or any suitable system may perform the steps described. Implementations described herein may be carried out on a user device, on a server, or a combination of both.

The computing device 500 also includes a software application 510, which may be stored on memory 506 or on any other suitable storage location or computer-readable medium. The software application 510 provides instructions that enable the processor 502 to perform the functions described herein and other functions. The components of the computing system 500 may be implemented by one or more processors or any combination of hardware devices, as well as any combination of hardware, software, firmware, etc.

For ease of illustration, FIG. 7 shows one block for each of the processor 502, operating system 504, memory 506, I/O interface 508, and software application 510. These blocks 502, 504, 506, 508, and 510 may represent multiple processors, operating systems, memories, I/O interfaces, and software applications. In various implementations, the computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while certain embodiments discussed herein use JWT tokens and QR codes, embodiments are not limited thereto. Alternative types of tokens and codes may be employed in embodiments within the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible and non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory processor-readable storage device including logic for execution by one or more hardware processors and when executed operable for facilitating establishment of secure communications between software systems by performing the following acts:
   receiving a first signal from a first computing system, the first signal including login information for logging into a second computing system;
   employing the second computing system to process the login information and generate a token and a registration link in response to receiving the first signal;
   embedding the token into the registration link;
   representing the registration link as a Quick Response (QR) code that is signed via a private key by the second computing system, wherein the private key is stored in the first computing system and associated with a public key previously provided to the second computing system;
   forwarding the registration link to the first computing system;
   in the first computing system, generating a request message including information from the registration link, wherein the information is signed with the private key and verifiable with the public key, and sending the request message to the second computing system using information included in the registration link;

detecting, by the second computing system, the request message from the first computing system, the request message requesting to access one or more computing resources of the second computing system;

authenticating the request message by validating signed information in the request message using the public key, thereby yielding an authenticated request message in response thereto; and employing the second computing system to selectively fulfill the authenticated request message for the first computing system, wherein the receiving, employing the second computing system to process the login information, embedding, forwarding, detecting, authenticating, and employing the second computing system to selectively fulfill the request message are performed by the one or more hardware processors.

2. The non-transitory processor-readable storage device of claim 1, wherein authenticating includes using Public Key Infrastructure (PKI).

3. The non-transitory processor-readable storage device of claim 1, further including representing the registration link as plain text on the first computing system.

4. The non-transitory processor-readable storage device of claim 1, wherein the token further specifies audience and issuer claims.

5. The non-transitory processor-readable storage device of claim 4, wherein the token includes specification of an expiry time of the token.

6. The non-transitory processor-readable storage device of claim 4, wherein the token includes a JavaScript Object Notation Language (JSON) Web Token (JWT).

7. The non-transitory processor-readable storage device of claim 1, wherein the second computing system includes a server system, and wherein the server system includes one or more authentication servers and one or more application servers.

8. The non-transitory processor-readable storage device of claim 7, wherein the one or more authentication servers run on the one or more application servers.

9. The non-transitory processor-readable storage device of claim 1, wherein the first computing system includes a software authentication device that further includes a mobile computing device and one or more authentication modules, and wherein the first computing system includes a local session storage and/or one or more cookies for storing the registration link received from the second computing system.

10. A method for facilitating establishment of secure communications between software systems the method comprising:

receiving a first signal from a first computing system, the first signal including login information for logging into a second computing system;

employing the second computing system to process the login information and generate a token and a registration link in response to receiving the first signal;

embedding the token into the registration link;

representing the registration link as a Quick Response (QR) code that is signed via a private key by the second computing system, wherein the private key is stored in the first computing system and associated with a public key previously provided to the second computing system;

forwarding the registration link to the first computing system;

in the first computing system, generating a request message including information from the registration link, wherein the information is signed with the private key and verifiable with the public key, and sending the request message to the second computing system using information included in the registration link;

detecting, by the second computing system, the request message from the first computing system, the request message requesting to access one or more computing resources of the second computing system;

authenticating the request message by validating signed information in the request message using the public key, thereby yielding an authenticated request message in response thereto; and employing the second computing system to selectively fulfill the authenticated request message for the first computing system, wherein the receiving, employing the second computing system to process the login information, embedding, forwarding, detecting, authenticating, and employing the second computing system to selectively fulfill the request message are performed by one or more hardware processors.

11. The method of claim 10, wherein authenticating includes using Public Key Infrastructure (PKI).

12. The method of claim 10, further including representing the registration link as plain text on the first computing system.

13. The method of claim 10, wherein the token further specifies audience and issuer claims.

14. The method of claim 13, wherein the token includes specification of an expiry time of the token.

15. The method of claim 13, wherein the token includes a JavaScript Object Notation Language (JSON) Web Token (JWT).

16. The method of claim 10, wherein the second computing system includes a server system, and wherein the server system includes one or more authentication servers and one or more application servers.

17. The method of claim 16, wherein the one or more authentication servers run on the one or more application servers, and wherein the first computing system includes a software authentication device that further includes a mobile computing device and one or more authentication modules.

18. An apparatus comprising:
one or more hardware processors; and
a non-transitory processor-readable storage device including instructions executable by the one or more hardware processors for:

receiving a first signal from a first computing system, the first signal including login information for logging into a second computing system;

employing the second computing system to process the login information and generate a token and a registration link in response to receiving the first signal;

embedding the token into the registration link;

representing the registration link as a Quick Response (QR) code that is signed via a private key by the second computing system, wherein the private key is stored in the first computing system and associated with a public key previously provided to the second computing system;

forwarding the registration link to the first computing system;

in the first computing system, generating a request message including information from the registration link, wherein the information is signed with the private key and verifiable with the public key, and sending the request message to the second computing system using information included in the registration link;

detecting, by the second computing system, the request message from the first computing system, the request message requesting to access one or more computing resources of the second computing system;

authenticating the request message by validating signed information in the request message using the public key, thereby yielding an authenticated request message in response thereto; and employing the second computing system to selectively fulfill the authenticated request message for the first computing system.

\* \* \* \* \*

UNITED STATES PATENT AND TRADEMARK OFFICE
CERTIFICATE OF CORRECTION

PATENT NO. : 11,134,071 B2
APPLICATION NO. : 15/959806
DATED : September 28, 2021
INVENTOR(S) : Kumar et al.

Page 1 of 1

It is certified that error appears in the above-identified patent and that said Letters Patent is hereby corrected as shown below:

In the Specification

In Column 17, Line 44, after "can" insert -- be --.

In the Claims

In Column 21, Line 51, in Claim 10, after "systems" insert -- , --.

Signed and Sealed this
Twenty-ninth Day of August, 2023

Katherine Kelly Vidal
*Director of the United States Patent and Trademark Office*